Jan. 2, 1951 — D. A. HOLLEY — 2,536,642
METHOD OF AND MEANS FOR CONTROLLING THE COOLANT
OF MARINE INTERNAL-COMBUSTION ENGINES
Filed Sept. 10, 1949
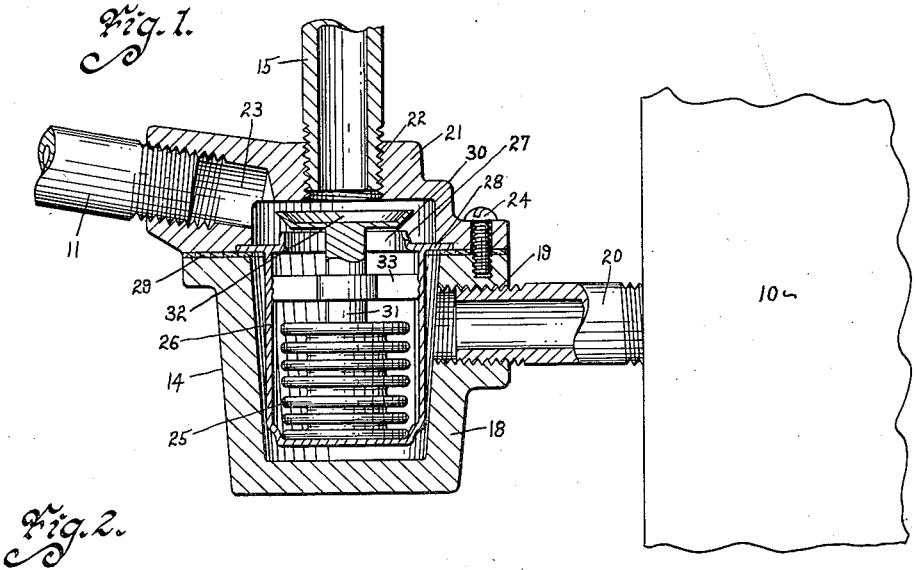
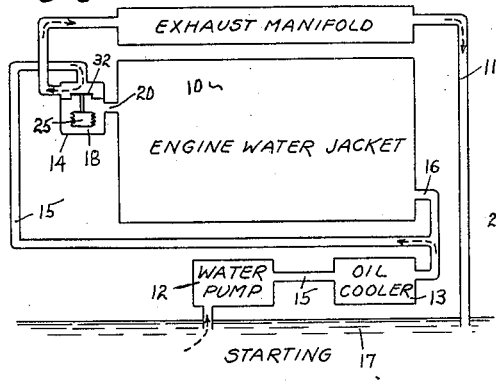
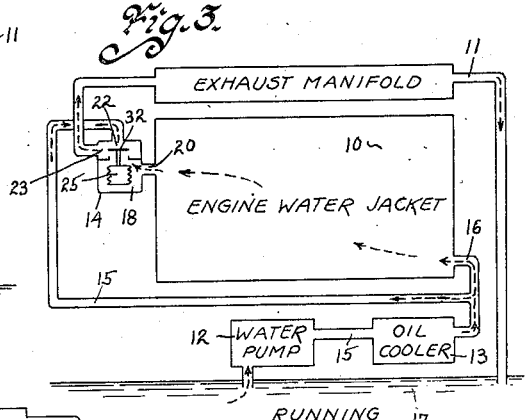
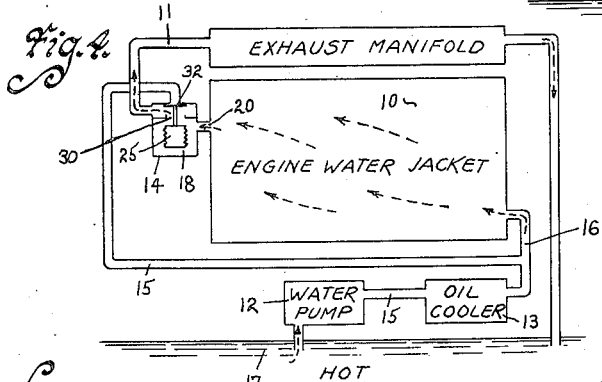
Inventor
Donald A. Holley
by M. Talbert Dick
Attorney
Witness
Edward P. Seeley Patented Jan. 2, 1951

2,536,642

UNITED STATES PATENT OFFICE 2,536,642

METHOD OF AND MEANS FOR CONTROLLING THE COOLANT OF MARINE INTERNAL-COMBUSTION ENGINES

Donald A. Holley, Waverly, Iowa

Application September 10, 1949, Serial No. 115,092

3 Claims. (Cl. 123—41.09)

My invention relates to a method of and means for regulating the flow and temperature of a coolant used in a marine internal combustion motor. This is done by an arrangement of pipes having a thermostatically controlled valve that are designed to maintain a uniform temperature in the water jacket on the motor and at the same time to prevent any sudden flow of cold water or the like into the water jacket when the motor is hot.

In the operation of marine engines, water for the cooling system is drawn from the body of water in which the boat containing the engine is floated. This water is generally very cold and when it is drawn into a hot engine serious damage can result thereto. Most engines have thermostats that open and close at predetermined temperatures. However, once the engine temperature reaches a designated point, the thermostat will open and permit a rush of cold water into the engine. As soon as the temperature drops to a fixed degree the thermostat will close to allow the water in the cooling system to heat. Thus, most present cooling systems operate by merely stopping and starting the flow of cold water from the lake, ocean or the like into the water jacket surrounding the engine.

Another problem in present type cooling systems having the ordinary thermostat just referred to arises when the motor is started. Here, the motor being cool, the thermostat is naturally closed and cold water is pumped directly into the water jacket. There it cannot circulate until it is heated sufficiently to open the thermostat. This cold water thus prevents the motor from operating efficiently until the water is heated. Very often in this regard it will be found that a marine engine that has been turned off for some time will have only a small amount of water in the cooling system because it is known that water tends to leak out of this type engine when they are not operating. When this condition exists, substantially the entire cooling system will be filled with cold water when the engine is started which prolongs the time before the engine will operate efficiently.

It is an object of my invention to provide a method of and means for circulating water in the cooling system of a marine internal combustion motor that will control the flow of cold water into the cooling system when the motor is started so that the motor can more quickly attain its most efficient operating temperature, due to the fact that cold water fills the cooling system slowly rather than quickly.

A further object of my invention is to provide an arrangement of pipes in the cooling system of a marine motor whereby when the motor is first started, a substantial part of the cold water drawn through the pump by-passes the water jacket and thereby allows the engine to quickly attain its most efficient operating temperature and also permits water to flow through a water jacket for cooling the oil for the engine irrespective of whether water flows through the engine water jacket or not.

A still further object of this invention is to provide a thermostatically controlled valve in the cooling system of a marine motor that during the normal operation of the motor will permit a reduced flow of hot water from the water jacket which is compensated for by a reduced flow of pumped cold water into the water jacket and thereby maintaining a uniform operating temperature of the water in the cooling system and also preventing any sudden release of hot water from, or any sudden entrance of cold water into the water jacket.

A still further object of this invention is to provide a thermostatically controlled valve as above referred to that when the water in the cooling system of a marine engine becomes too hot, will permit a steady unretarded flow thereof from the water jacket to a point of discharge, and which flow will be compensated for by a steady incoming flow of cold water and which thermostatic control will reduce the respective outgoing and incoming flows as the temperature in the water jacket is reduced.

A still further object of my invention is to provide a method of and means for regulating the flow of water and temperature thereof in the cooling system of a marine engine that is economical in manufacture, efficient in use and durable in construction.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a cross-sectional view of my thermostatically controlled valve shown in communication with the water jacket of a marine engine, Fig. 2 is a diagrammatic view showing my arrangement of the valve in Fig. 1 in the cooling system of an engine and further illustrating the position of the valve and the flow of water when the engine is cool and about to be started, Fig. 3 is a diagrammatic view similar to Fig. 2 but showing the position of the valve and the flow of water when the engine is operating at its normally efficient temperature, and Fig. 4 is a diagrammatic view similar to Fig. 2 and Fig. 3 but showing the position of the valve and the flow of water when the temperature of the coolant in the cooling system of the engine is above that required for normal operation.

In the diagrammatic drawings I show a water jacket 10, exhaust line 11, water pump 12, oil cooler 13, and a valve member 14 which represents part of the elements in the cooling system for a marine engine with which my invention is concerned. A water feed line 15 extends from the pump 12 through the oil cooler 13 to the valve 14. The line 15 also extends into the water jacket 10 by means of the line portion 16 and the pump 12 is designed to communicate with a source of water such as 17.

The valve member 14 is shown in cross-section in Fig. 1. In this valve the numeral 18 designates a housing member provided with the side threaded opening 19 that is designed to receive the short pipe length 20. The outer end of the pipe 20 communicates with the water jacket 10, as shown in Fig. 1.

A cover member 21 provided with a top opening 22 and a side opening 23 is detachably secured to the top of the housing 18 in any suitable manner such as by the stud screw 24. Each of the openings 22 and 23 communicate with the inside of the housing 18 and the opening 23 is positioned on the opposite side of the valve unit 14 to the opening 19, as shown in Fig. 1. The exhaust line 11 is threaded into the side opening 23 and the water feed line 15 is threaded into the top opening 22.

A bellows type expandable thermostat 25 placed within a U-shaped support bar 26 is mounted within the housing 18. A collar member 27, provided with the circumscribing flange 28 is secured to the open end portion of the U support 26 so that the flange 28 extends laterally at right angles to the support bar 26 to form a lip portion that rests on the top of the housing 18 above the gasket 29, as shown in Fig. 1. Thus arranged the opening 30 formed by the collar 27 provides a passageway into and out of the portion of the housing 18 containing the thermostat 25.

Secured to the bellows 25 and movable therewith is the shaft 31 which has the valve disc head 32 on the top thereof. The shaft 31 extends through and is girded by the cross bar 33. The bottom of the disc 32 is capable of seating in the opening 30 at times and the top of the valve disc 32 is capable of seating in the opening 22 at times.

When the water flow pipes and thermostatic valve are arranged as described, in the cooling system for a marine motor, the flow and temperature of the water can be controlled as follows:

When a motor has cooled from sitting idle the position of the valve 14 is shown in Fig. 1. Here the opening 30 into the main portion of the housing 18 is closed by the valve disc 32 because the motor being cool, the bellows 25 are in a contracted position. This closed position of the valve 14 is further illustrated in Fig. 2 where it is apparent that as long as the valve 14 is closed, no water can pass from the water jacket 10 to the exhaust line 11. When the motor is about to be started there may be some water in the water jacket but it is unlikely that it is full since in marine type engines there is usually a leakage from the jacket when the motor is idle. Consequently, if when the motor is started, the jacket is quickly filled with cold water 17, there would be a longer time interval before an operating temperature is reached than if the water entered the jacket slowly. This slow flow of water 17 into the jacket 10 is one of the improvements I have accomplished. As the motor is started, the pump 12 of course, begins to operate and water is pumped through the feed line 15. Because one outlet from the jacket 10 is closed, due to the position of the valve 14, very little, if any, water will pass through the pipe portion 16 into the jacket. Instead, however, it will flow through the pipe 15, thence through the opening 22 and out the opening 23 to the exhaust line 11.

In this way the cold water will by-pass the water jacket initially and as this water passes through the openings 22 and 23 as illustrated by the arrows in Fig. 2 it will have a tendency to cool the valve 14 so as to maintain it in closed position. In the meantime, the engine is running with little, if any water in the jacket and no perceptible amount of cold water entering the jacket so that it will tend to quickly reach its most efficient operating temperature.

At this point it is noted that the thermostatic valve 14 is positioned close to the water jacket 10 by means of the short pipe length 20. The purpose of this is to place the valve 14 where it can be actuated by heat from the engine. Thus as soon as the heat from the engine reaches a predetermined temperature the bellows 25 will expand so that the valve disc 32 rises to the position shown in Fig. 3. As this occurs an outlet is provided from the water jacket 10, through the opening 30 to the opening 23 into the exhaust line and at this time the water 17 will flow not only through pipe 15 but also through the pipe portion 16 into the water jacket.

However, because of my arrangement of the pipes in this cooling system, no sudden full pressure flow of cold water enters the water jacket since a part of the flow as above stated by-passes the jacket, as shown in Fig. 3. A portion of the water from the pump flows through pipe 15 into the valve 14 so that the valve is subjected to hot water from the engine and cold water from the pump. Thus the mean temperature in the valve is sufficient to partially open the passageways at 30 and 22 but neither cold nor hot enough to entirely open or close either completely. Consequently, the flow of hot water out of the jacket at opening 30 is restricted and likewise the flow of cold water into the jacket at line 16 is correspondingly limited so that a uniform operating temperature can more efficiently be maintained.

It is important to observe that the location of the oil cooler 13 is such that the oil will be cooled whether water is flowing into the engine water jacket or not.

Should the water in the engine water jacket become too hot, the bellows 25 will extend until the opening 22 is closed by the valve head 32, as shown in Fig. 4. This will permit an unretarded flow of hot water from the jacket to the exhaust and at the same time stop the flow of cold water from the pump into the valve 14. Obviously, then a greater supply of cold water will enter the jacket 10 through the pipe portion 16. This will quickly reduce the excessive temperature of the engine and as soon as it is reduced to normal heat the bellows will contract sufficiently to assume the position shown in Fig. 3 and operate as previously described.

From the above description it is apparent that my method and means for controlling the temperature of the water in the cooling system of a marine engine accomplishes a result analogous to that of a mixing faucet through which water flows into a container. Instead of the present type of thermostatically controlled water lines that open and shut to allow a full flow of hot water out of, and a full flow of cold water into, a water jacket at times, my invention permits a controlled flow of excessively hot water out of the jacket and at the same time allows a compensating controlled flow of cold water into the jacket so that a mean determined temperature can be maintained and thus preventing any sudden undue variations in the temperature of the water in the engine jacket.

Some changes may be made in the construction and arrangement of my method of and means for controlling the coolant of a marine internal combustion motor without departing from the real spirit and purpose of my invention, and it is my intention to cover by my claims, any modified forms of structure or use of mechanical equivalents which may be reasonably included within their scope.

I claim:

1. In a cooling system for a marine internal combustion engine having a water jacket, a water line communicating with a source of water supply at one end and with said water jacket at the other end, a water pump in said line, a water discharge pipe in said jacket, a thermostatically controlled valve member connected to the end of said discharge pipe, an exhaust pipe communicating at one end with said valve and extending at its other end to a point of discharge, and a second water line communicating at one end with said first mentioned water line and at its other end with said valve member.

2. In a cooling system for a marine internal combustion engine having a water jacket, a water line communicating with a source of water supply at one end and with said water jacket at the other end, a water pump in said line, an oil cooling water jacket in said water line intermediate said pump and said engine water jacket; a water discharge pipe in said jacket, a thermostatically controlled valve member connected to the end of said discharge pipe, an exhaust pipe communicating at one end with said valve and extending at its other end to a point of discharge, and a second water line communicating at one end with said first mentioned water line and at its other end with said valve member.

3. In a cooling system for a marine internal combustion engine having a water jacket, a water line communicating with a source of water supply at one end and with said water jacket at the other end, a water pump in said line, a water discharge pipe in said jacket, a valve housing provided with a thermostatically controlled valve member connected to the end of said discharge pipe, an exhaust pipe communicating at one end with said valve housing and extending at its other end to a point of discharge, and a second water line comunicating at one end with said first mentioned water line and at its other end with said valve housing member; said valve capable of controlling the flow of water through said discharge pipe at times and also capable of controlling the flow of water through said exhaust pipe and said second mentioned water line at times.

DONALD A. HOLLEY.

REFERENCES CITED

The following references are of record in the file of this patent:

UNITED STATES PATENTS

| Number | Name | Date |
| --- | --- | --- |
| 2,377,028 | Nicholas | May 29, 1945 |
| 2,401,646 | Johnson | June 4, 1946 |